US007711449B2

(12) United States Patent
Abdulhay et al.

(10) Patent No.: US 7,711,449 B2
(45) Date of Patent: May 4, 2010

(54) PERSONAL MEDICATION DISPENSER

(76) Inventors: Gazi Abdulhay, 2724 Rickenbacker Ct., Orefield, PA (US) 18069; Chadwick E. Dean, 3 Lindenwood Dr., Exton, PA (US) 19341

( * ) Notice: Subject to any disclaimer, the term of this patent is extended or adjusted under 35 U.S.C. 154(b) by 0 days.

(21) Appl. No.: 11/741,313

(22) Filed: Apr. 27, 2007

(65) Prior Publication Data

US 2007/0257051 A1 Nov. 8, 2007

Related U.S. Application Data

(63) Continuation of application No. 11/356,764, filed on Feb. 17, 2006, now Pat. No. 7,213,721, which is a continuation of application No. 10/438,452, filed on May 14, 2003, now Pat. No. 7,048,141.

(60) Provisional application No. 60/378,105, filed on May 14, 2002.

(51) Int. Cl.
*G06F 17/00* (2006.01)

(52) U.S. Cl. ............................... 700/236; 221/2; 221/9; 221/13; 700/231; 700/237

(58) Field of Classification Search ....................... None
See application file for complete search history.

(56) References Cited

U.S. PATENT DOCUMENTS 5,219,093 A * 6/1993 Moulding et al. ........... 221/259
5,392,952 A * 2/1995 Bowden ...................... 221/15
5,582,323 A * 12/1996 Kurtenbach .................... 221/2
6,510,962 B1 * 1/2003 Lim ............................ 221/15
7,048,141 B2 * 5/2006 Abdulhay et al. .............. 221/3
7,213,721 B2 * 5/2007 Abdulhay et al. .............. 221/3
2002/0070227 A1 * 6/2002 Ferruccio ..................... 221/15
2003/0183642 A1 * 10/2003 Kempker, Sr. ................. 221/2

* cited by examiner

*Primary Examiner*—Gene Crawford
*Assistant Examiner*—Timothy R Waggoner
(74) *Attorney, Agent, or Firm*—Charles A. Wilkinson; Clinton H. Wilkinson

(57) ABSTRACT

An automated personal pill dispenser has one or more chambers for holding a supply of pills. A feed mechanism is associated with each chamber and is selectively operable to dispense an incremental number of pills from each respective chamber. A programmable controller is coupled to control and operate the feed mechanism. The controller has a timer, a memory and an input means and is programmably operable by the user and/or by remote input from a smart card, PDA or various networks such as one having access to data from a pharmacy. The programming presets at least one of a time and a number of pills to be dispensed from each chamber. The controller operates an alarm to alert the user and operates the feed mechanism to dispense pills at the preset time and number, also detecting the user's access to obtain the dispensed pills.

14 Claims, 8 Drawing Sheets

PERSONAL MEDICATION DISPENSER

CROSS REFERENCE TO RELATED APPLICATIONS

This application is a continuation of U.S. patent application Ser. No. 11/356,764, filed Feb. 17, 2006, which is a continuation of U.S. Pat. No. 7,048,141, issued May 23, 2006, which claims the benefit of U.S. Provisional Patent Application No. 60/378,105, filed May 14, 2002, the contents of each of which are hereby incorporated by reference as if set forth.

FIELD OF THE INVENTION

The invention concerns a personal dispenser for medication, particularly pills of a pressed-granular, capsule or gel form, having programmable features for achieving accuracy in the scheduling of dosages and medication times, with timing and alarm features for alerting the user, and recording and reporting aspects for monitoring compliance.

BACKGROUND OF THE INVENTION

Pill dispensers are known of a type that has a series of compartments that the user is required to load with the correct type and number of pills to be consumed according to some schedule of prescribed dosage. It may be important for the medication to be taken at the correct schedule, but there are complications.

One complication is the possible number of pills involved and the incompatible nature of the time schedules that are applied. For example, the user might be expected to take one pill in the morning, another before meals, another at bedtime, a different one twice per day (time unspecified), one upon the occurrence of particular symptoms (e.g., pain), but not in certain situations (e.g., not on an empty stomach). These requirements make it difficult for the user (patient) to understand and comply with dosage prescriptions.

The user might obtain a dispenser having seven compartments for a week's medication, e.g., to be taken at a certain time of day. The user can count out the pills for the week according to the number per day per compartment. This technique is workable if there are only a few types of pills and times of day for taking them, but can become complicated if there are different times of day and numerous pills to be taken at different time schedules.

Programmed apparatus such as medication dispensers in hospitals or nurse stations can help organize the dispensing of pills for a number of patients. The dispensers can operate on short time intervals, such as each half hour or other convenient time for a nurse to make rounds to patients. The programming is such that, if operated in a predictable way, can accommodate complicated different pill schedules and even irregular schedules if so prescribed. The apparatus is coupled to a network whereby medication is counted out and labeled for a patient, and can include data coordination with other systems. For example, integration with patient billing records allows charges to be incremented to account for dispensing to a given patient and integration with pharmacy stocking can help manage reordering, etc. The apparatus can even be coupled to a safety assurance system to prevent conflicts between incompatible medications.

Such sophisticated systems are not justified for an individual's use, but there is a need for a personal pill dispenser that has at least some of the benefits of automation, that is capable of managing a schedule of different pills to be taken at different scheduled times, preferably taking into account or at least displaying any specific instructions as well as alarming for timing when it is time to take a pill and accounting for whether or not the schedule is met.

SUMMARY OF THE INVENTION

It is an object of the invention to enhance compliance with regimes of taking medications. According to one aspect, this is accomplished by a programmable unit that allows one to simply input a prescribed dose and schedule of dosage for a medicine, into one or several available chambers. Once the unit is thus loaded and armed to execute the medication schedule, it alerts the person when he/she is due to take a dose, and attends to monitoring and counting the dosage and reading out associated warnings.

In the medical field, one of the most problematic issues is compliance with taking medications on schedule. This problem applies to a majority of the people on medications. For some prescribed medications, compliance is as low as twenty percent. This problem is becoming more significant as a greater proportion of the population becomes aged. With aging not only are memory problems seen with a greater frequency but the number of medications taken are increased. To take four medications, each twice a day, for example, requires one to open and close all of these medicine bottles eight times a day. The number is greater with higher numbers of medications and greater frequency of use.

It is thus the object of this invention to enable one to accomplish some or all of the following goals:

- to place medications (up to 4, 6, 8 meds) into one or more pre-sized cylinder/funnel containers, with childproof caps that are placed into the mechanical unit that will dispense pill(s) on predetermined time and schedule without having to constantly open and close medicine bottle(s) each time medication(s) have to be taken;
- to have a program with a touch-screen that enables one to simply input the required information;
- to be reminded with an alert by the unit or a remote, by a chosen chime/music, to take the medication(s) on time and schedule and be rewarded by a chosen message/music;
- to be able to keep track of up to 8, 12, 16 medications at once,
- to be able to track short term, and long range time and schedule for regularly used medications;
- to have early warnings when supply in the unit is low, and to reorder as needed;
- to have an override button that would dispense on demand, one or all meds;
- to be able to send information to pharmacy to coordinate all medication;
- to be able to receive information from a pharmacy/doctor's office for automatic programming of how, when, how much of a given medicine to be taken and with all necessary precautions, by use of phone lines/wireless technology or magnetic info card;
- to be able to receive and dispense medications in a pre-packaged/pre-labeled cylinder-funnel container that is placed into the unit directly, thereby minimizing human error;
- to be able to voice record personalized messages to remind/alert and reward one, brining in human dimensions and further improving compliance;
- to be able to receive info from pharmacy/doctors office on routine checkups;

to be able to send personal health-observations information to doctors office; and, to be able to remind one to maintain time and schedule of medications (up to 4, 6, 8 meds) that are not suitable for this unit (i.e.; liquids, syrups, etc.).

According to one aspect, the invention provides a pill dispenser for dispensing a dose of pill medication. The pill dispensed includes at least one chamber for holding a bulk supply of like and loose pills, a feed mechanism associated with each chamber and operable selectively to incrementally feed a number of pills from the associated chamber, and a programmable controller coupled to control the feed mechanism. The controller has a timer, a memory and an input means. The controller is operable programmably to preset at least one of a time and a number of pills to be dispensed from each chamber and to operate the feed mechanism to feed pills from each chamber at the preset time and number.

Additional objects, advantages and novel features of the invention will be set forth in part in the description as follows, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The drawings show certain embodiments as presently preferred. These embodiments are illustrative rather than limiting, and reference should be made to the appended claims to determine the scope of the invention. In the drawings.

DETAILED DESCRIPTION OF THE INVENTION

Figure 1:
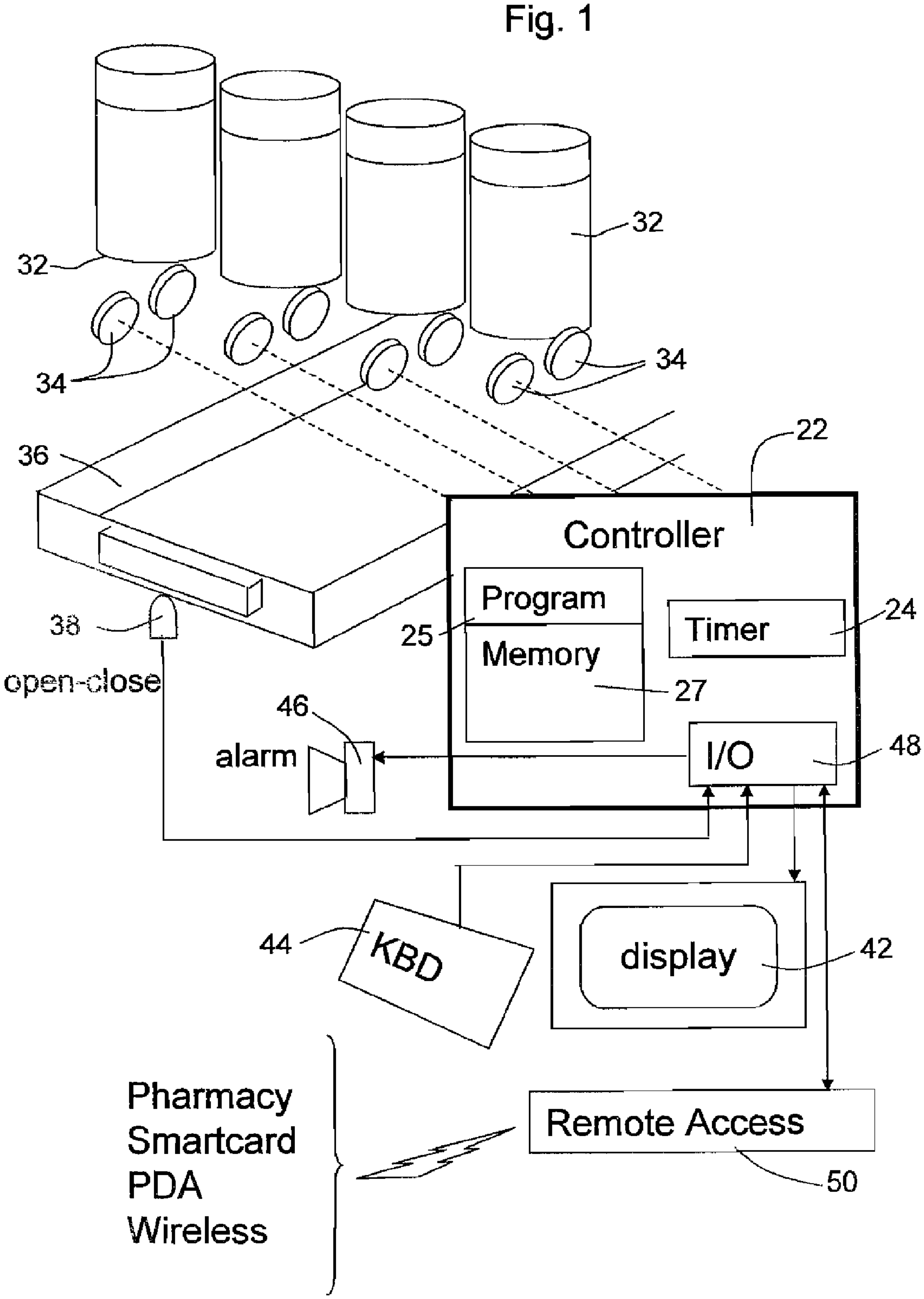
FIG. 1 is a block diagram illustrating elements of a portable personal medication dispenser according to the invention.
Figure 4:
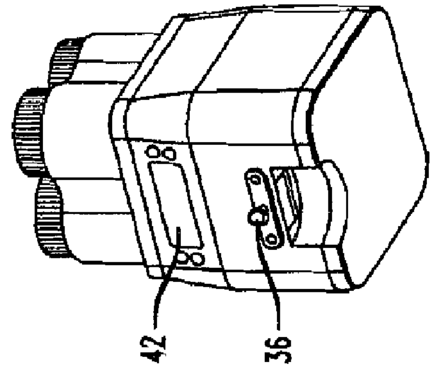
FIG. 4 is a perspective from below.
Figure 7:
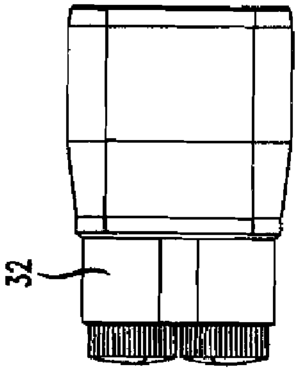
FIGS. 5, 6 and 7 are elevation views respectively from the front, top and rear.
Figure 3:
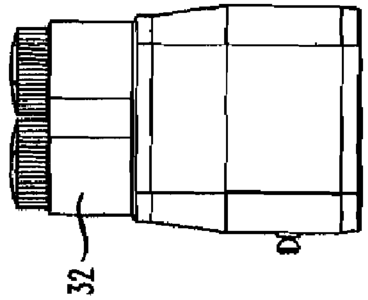
FIG. 3 is a side elevation of the unit as shown in FIG. 2.
Figure 6:
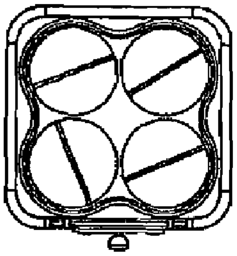
Figure 2:
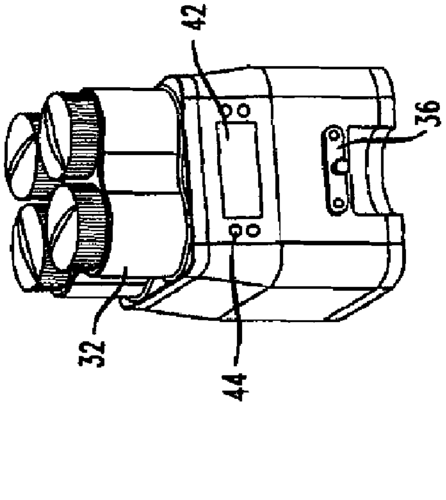
FIG. 2 is a perspective view showing a counter-top version of the unit.
Figure 5:
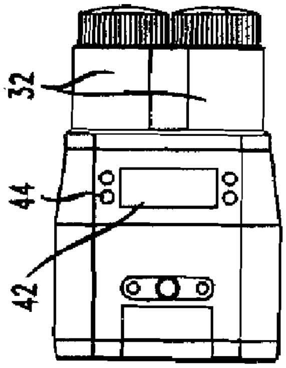
Figure 8:
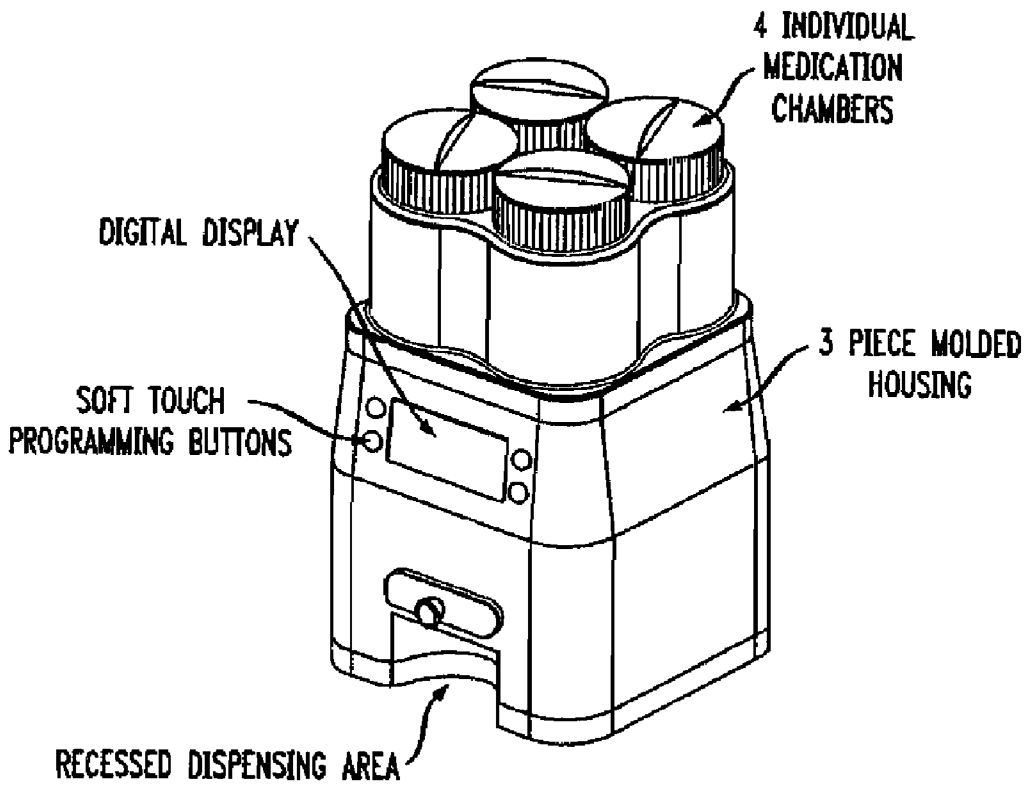
FIG. 8 is a perspective view for illustrating certain operational aspects.

The invention comprises a device for dispensing medication, wherein a programmed controller or processor associated with a feeding mechanism is arranged to manage a timed schedule of dosages from a plurality of different medications for at least one user. The invention is discussed with respect to the example of a single user and four medication supplies, the medication being in the form of discrete pills such as tablets, capsules or the like. It should be appreciated that the invention is likewise applicable to more or fewer medication supplies, or to plural users such as those of a family. In one embodiment, the device may include only one chamber and one medication supply.

One aspect of the invention is to manage dispensing of medications for a given person, in a partly automated manner so as to benefit from the use of a processor to at least alert the user and to feed selected doses from supplies of multiple drugs. The invention is shown in block diagram form in FIG. 1. A controller 22 has a built in timer 24, for example with a crystal oscillator that is always powered, preferably from a battery (not shown) so as to monitor the time of day and the progression of days (preferably to monitor the exact date and time). The controller 22 has a program 25 stored, for example, in ROM firmware. According to operation of the program 25, the controller 22 stores volatile information in an associated memory 27.

The information stored in memory 27 includes a schedule of dosages of medications to be dispensed from one or more supply bins 32, which can be loaded by the user or by a pharmacist when programming the device to dispense the associated medications. The controller 22 is arranged by programmed selections to dispense the correct pill(s) at a preset predetermined time. Although shown with four supply bins 32 in the illustrated embodiment, it should be understood that this is exemplary only and in other exemplary embodiments there may be only one supply bin 32.

The patient or user is required actually to collect the dispensed pill(s) from the device and to imbibe them. Thus there is a manual aspect that requires the user's cooperation. However, the controller is preferably programmed to deal with the vagaries of the user's activities by generating appropriate alarms when the programmed schedule dictates that a dose is due and dispenses it. The controller is also coupled to certain sensing arrangements for determining whether and when the dispensed pills were collected, and thus can monitor the extent of compliance with the preset schedule.

In the embodiment shown, the individual pill supply bins 32 feed pills by gravity to funnel shaped discharges (not shown in FIG. 1) between feed rollers 34, of which one is movable under the power of a motor, ratchet/pawl solenoid arrangement or other electromechanical feed technique, from signals produced by controller 22 at the required times. The feed rollers 34 normally block discharge of pills from the containers or supply bins 32, but engage and advance dispensed pills, one at a time, when the rollers 34 are operated. The count of dispensed pills, which can be detected or assumed as a function of the advance of the feed rollers, is a datum managed in the memory 27 of the controller 22. For example, the controller operates switched outputs to couple electromechanical moving devices such as motors or solenoids to the battery power supply or to a plug-in domestic power source in a counter-top unit, for passing increments of dosage, preferably single pills.

The feed rollers 34 drop the dispensed pills into a drawer or receptacle area 36, which contains a mechanically movable part such as a sweep, sliding drawer, openable door, chute or the like, to which is coupled a sensor 38 such as a magnetic reed switch, a mechanical limit switch or the like, whereby a signal is produced to the controller 22 when the dispensed pills have been accessed by the user, by operating the drawer or other receptacle area 36.

The presetting or programming of the schedule of doses can be programmed by the user via a front panel arrangement, explained further below, that comprises a display 42 and at least one switch input device 44, generally shown in FIG. 1 as a keyboard.

The user interface also includes an alarm or annunciator device 46, for producing an audio alarm such as a buzzer or bell sound, or for playing back more complicated instructions by reading out a recorded audio track. The controller accepts inputs from the keyboard 44 and monitors the condition of the feeding mechanism, and also produces outputs for the alarm and the display, through an input/output interface 48 that comprises conventional output drivers for producing the required outputs and amplifiers, isolators or switched devices responsive to inputs.

Preferably, the device is subject to programming by the user's switch inputs to controller 22 in a programming mode enabling presetting of the dose and schedule, and preferably also a preset reminder schedule. According to an inventive aspect, the device is also programmable over at least one remote access path 50, shown generally in FIG. 1, by which a program can be downloaded into the memory 27 from another device. This permits a doctor who prescribes a medication and dosage schedule, or a pharmacy that provides the medication and instructions to the user (e.g., by labeling a container supplied to the user and containing the medication container), to likewise provide instructions that can govern operation of the program of controller 22 and its activities in dispensing medication. A more complicated dosage program is thus possible, including prompting the user for additional input that could affect the timing and dosage of medication that should be dispensed. That is, the programmed instructions can prompt the user at a preset time for dispensing a dose, as to when the user last ate, etc., and adjust the dosage if necessary by choice of the number of pills dispensed or choice of the chamber, i.e. supply bin 32 from which different dosages of the same medication might be dispensed.

Such programmed user-prompt features can be provided in a medication dispensing package according to the invention, which package is supplied with standard dosage programs and schedules by the pharmaceutical manufacturer and need not be programmed by the user. Alternatively, the device can be wholly programmed by the user, who uses the keyboard 44 and display 42 to effectively enter into the memory 27 some or all of the instructions and warnings that are found on the package of medication received from a pharmacist. Also, some intermediate level of programming is possible, for example with the user delivering the dispenser to the pharmacist when filling a prescription and the pharmacist attending to programming using a computer interface.

In an example, it is assumed that the patient picks up the drugs from the pharmacy in pill form, and empties them into a given chamber (supply bin 32). The chamber has a child-proof cap or a lock, and can include means for detecting access (e.g., opening of one of the caps on the chambers), whereby the controller program is assured that the subsequently entered instructions from the user apply to the container that was just opened.

The unit can also be responsive to the size and shape of a given pill. For example, the different supply bins 32 can be structured and sized for feeding pills of different size and/or shape. In any event, the controller 22 operates to deliver the necessary number of pills at a programmed preset time or at a time that is calculated from operation of the program, or both.

The unit may have several chambers to accommodate multiple drugs to be dispensed by a given person, and alternatively can prompt the user to identify him/herself to manage dispensing of pills to different persons. Preferably, to avoid any errors in which one person mistakenly imbibes medication intended for another person, the devices are specific to a user. However, with prompting and programming, it is possible to employ the controller 22 to manage multiple users. It is also possible to couple two or more dispensers each capable of dispensing, for example, four or six different medication types, so as to manage dispensing of eight or twelve different pills containing different medications or different dosages of the same medication, etc.

In a preferred simple arrangement, the user programs the device by responding to prompt questions that are displayed on a screen that has sufficiently large print to be readily read. The questions can be more or less complex, but at least provide enough information to set into memory 27 information on which supply bin 32 is affected (i.e., which is being loaded contemporaneously with medication), and when the prescription dictates that the pills are to be taken. The scheduling questions can be posed in various ways, for example concerning the hours of delay between doses, the time of day, whether the pills are to be taken at bedtime or upon awakening or with meals, when those events (e.g., awakening) normally occur, etc.

Once these questions are answered the memory contains sufficient information for the controller 22 to alert the user and to manage dispensing of pills. At the programmed time, the unit operates alarm 46, e.g., to produce a beep or musical tone in a basic model, or to read out recorded spoken instructions, verbal warnings and the like in a more sophisticated version. Preferably, there is an option to pre-record instructions by the user, e.g., so that instructions are read out in a particular person's voice, so as to personalize the reminders and rewards, and perhaps to better distinguish pills intended for one user versus another who may have a dispenser of his/her own.

The person responding to the alert can be required to operate a switch on keyboard 44, e.g., to silence the alarm. Alternatively the alarm can have a short and preset length of time during which the alarm is sounded, optionally with a series of following reminders until the user arrives to collect the medication. The actual dispensing can be accomplished on time, followed by sounding of the alarm, or the actual dispensing can occur only when the user responds to the alarm, e.g., by operating a switch input.

In the preferred embodiment, the controller 22 dispenses the pills and briefly operates alarm 46. The user collects the pills in a manner that is detectable by the controller, e.g., pulling open a drawer that causes the dispensed pills to drop into a cup or into the user's hand. Pushing the drawer closed again resets the machine and is interpreted by the controller as an indication that the pills have been dispensed and taken at that particular time. (Obviously whether they actually are taken or not still requires the cooperation of the user or patient.) The process repeats for the dosage scheduled at the next predetermined time.

The program 25 can have stored programs that are read out to alert the patient to take medications with or without meals, with fluids, or other specific advice, as a function of information entered when programming the device. Such messages can be stored in memory 27 and selected as a function of the name of the medication entered by the user or selected from a menu when programming the schedule of doses. Such warnings, for example, remind the patient if he/she needs to eat or to have an empty stomach when taking the medication. The warnings can be more or less complicated and more or less specific, for example, providing information as to how long before or after taking medication the user should eat (or not eat) and perhaps adjusting the schedule if necessary.

In a basic embodiment, all dosage scheduling is done by the patient when loading the unit. In a more complicated embodiment, the pharmacist can provide schedule and warning information by programming the unit or by providing the user with a means to enter the information. For example, the remote access path 50 can be arranged to read from (and possibly also write reporting information to) an integrated circuit card or smart card, a diskette or the like. In another example, the remote access path 50 can couple to a wireless or modem interface with a phone line to a computer system operated by the prescribing doctor or the pharmacist or the pharmaceutical supplier, or by a network link over the Internet.

In an advantageous embodiment, the patient is prescribed a particular medication by a physician, which prescription is to be filled by a pharmacy. The pharmacy provides a data storage medium (e.g., provides a smart card or adds information to a smart card medical information device belonging to the user) or enables a telecommunications link that the user can invoke. In this way, the pharmacy can provide necessary drug usage and warning information (dosage schedules, instructions, do's and don'ts), as well as spelling out the details of the prescription (e.g., naming the medication, the prescribing physician, etc.), and otherwise giving the user all the information that is conventionally printed on the containers, packaging and associated contraindications hard copy labels and handouts. More extensive information, and information that is accessed by drilling down through a series of prompted or menu-selection responses are also possible. The information available in this way is not limited to descriptive information to be played back to the user, but also can provide programming instructions that modify operation of the controller 22.

Automated programming using a smart card, computer network interface or personal digital assistant (PDA) download is advantageous. The unit can be provided with a smart card read/write slot, a TCP/IP network interface, a USB interface to a personal computer, a port to a wireless home network hub, or other automated programming and information transfer devices and capabilities. This automation minimizes certain kinds of errors due to the "human factor."

Preferably the disseminated information is freely available, but another advantageous aspect is that automation on this level provides a good audit trail whereby there is a record as to medications involved, warnings given, times of dispensing, etc. Preferably, the unit is registered at that associated pharmacy, in a manner similar to recording a prescription filled there, in connection with programming the unit automatically from a data store or manually by the pharmacist or otherwise.

A number of additional feature are possible. In one embodiment, the unit has a remote alert device that can be placed at a convenient site at the home, so if the person is at home but away from the area of the main unit, the remote alarm alerts the person to take scheduled medications. The remote alert device can be arranged to sound a simple chime or other alert signal, or the remote alert device can communicate more fully with the controller. For example the remote alert device can operate like an intercom to read out a more complicated voice message or other signal originating at the controller 22. The remote device can also operate to alert a user who is away from the premises, for example delivering a warning to the person over a beeper or cell phone, or by automated transmission of a message to a PDA having email capability.

In the preferred embodiment, the unit is concerned with delivery of medication in loose pill form. The unit can be arranged to deliver medication in other forms, such as blister packaged pills on a strip that is fed from the unit, liquid medications from a valved supply etc. Alternatively, the unit can have the capability simply to remind the user of medication related information without actually delivering pills. Thus, the controller could be arranged to remind the user when a schedule requires the administration of liquid medications.

As another aspect, the programming of the system and/or the information provided when a supply of medication is loaded, preferably includes a count of the number of pills loaded in each of the supply bins 32. This enables the controller to keep a count of the remaining pill supply and to forecast when the supply will be exhausted. One of the messages that is provided to the user, either automatically or upon user request, is an estimation date or time at which the supply is likely to be exhausted. This is helpful to notify persons when their regularly-taken medications are low and need to be reordered. It is also possible to base the estimation of the remaining life of a supply of medications that are taken on demand as opposed to a regular schedule. This estimation calculates the estimated time to use of last pill in the supply while counting down the number of pills remaining. The estimate can be based on the average rate of usage or the usage over a predetermined number of pills (such as the time taken to use the previous pills whose number is equal to the number of remaining pills). These calculations are a simple matter for the controller, provided the number of pills actually entered in the supply bins 32 is entered initially.

The unit can be used to dispense PRN ("take as needed") medications at least partly by the user's request instead of scheduling. In that case, additional calculations can be based on the maximum dose of PRN medications that are permitted over a given period, such as a full day, and a reminder as to the remaining number available subject to that limit. Alternatively, the unit can calculate the average time per pill available subject to the limit. The unit can keep count of the maximum and simply dispense a warning instead of a pill when the maximum is exceeded. It is possible to have the unit be preset, but preferably it can be overridden by user input, so that the user has no incentive to remove a pill from a supply bin 32 rather than to dispense it through operation of the controller 22 and thus keep the count accurate.

In FIG. 1, the unit has a keyboard 44 for user input and a display 42. The keyboard could be limited to a few switches or could be more complicated, for scanning through menus by letter string searches. The display is preferably a simple liquid crystal display but could also be a touch screen arrangement. The subject matter displayed, as discussed above, can be the readout of canned and calculated information, or could include a terminal with extensively programmed input and output possibilities such as questions and answers related to medical and pharmacological facts.

The dispenser of the invention is subject to integration with other stores of medical information for the user. The unit can have specific user health information programmed into memory such as allergies and health alerts. The information can be updated in view of the results of the person's regular checkups, for example so as to permit the unit to check for contraindications that might related to variable parameters such as blood pressure or blood chemistry values. This information may originate at or be coupled through data network communications with the subject's physician's office, and could also provide programmed warnings to the physician as well as the patient. Physician warnings could recommend tests that might done and could suggest or even schedule checkups and office visits. In connection with electrical measurement devices coupleable to the unit, for pulse rate, blood pressure, etc., the unit could provide an input method for collecting patient health status information to be reported to the patient's physician's office as a remote diagnostic tool.

The dispenser unit preferably is portable. It can be connected to a wall outlet for power or for recharging. It preferably has a long-life battery coupled to retain the contents of the volatile memory portion and to keep the timer 24 in operation.

FIGS. 2-8 show a number of views of a proposed integral countertop unit that has the elements shown in FIG. 1. In this embodiment the containers or supply bins 32 are protruding cylindrical chambers that are separately capped, and which resemble pill vials. This arrangement has rounded portions associated with each cylindrical chamber that can be labeled in the same way as a pill vial.

In the embodiment shown, the display 42 is a simple LCD panel and the keyboard 44 is a set of several buttons associated with the display. In another preferred arrangement, a touch screen input device can be used, for example to be operated by a user with a stylus of by finger contact.

According to an alternative embodiment, the supply bins 32 can be pre-filled removable chambers, which permit a supply of medication to be loaded as a cartridge and snapped into place in a manner similar to loading an ink jet printer with a supply of ink. This is particularly apt for medications taken on a regular basis. The cartridges in the unit can have different numbers of pills of different sizes, perhaps containing as much as a three-month supply, with some cartridges or chambers being higher than others as needed. The pre-filled chambers can remain sealed as shipped directly from the supplier. The removable chambers (i.e. supply bins 32) are installed by snapping them into position, ready for dispensing. Pre-filled cartridge chambers containing pills are preferably fully labeled and accompanied by written information. The chambers can have automatic data captured aspects such as a magnetic stripe or other codes, for defining a serial number that is associated by the controller with other pertinent information such as the type and pill count of the medication.

Preferably the dispenser has an override function or button that permits the user to override the timed programming or other features so as to dispense a pill on demand and regardless of other programmed limitations. This override function is provided to improve the accuracy of the count of remaining pills and the recording of the dispensing of pills, because it is recognized that if the user wants to override any programmed limitations, the user could remove or uncover a chamber.

Figure 9:
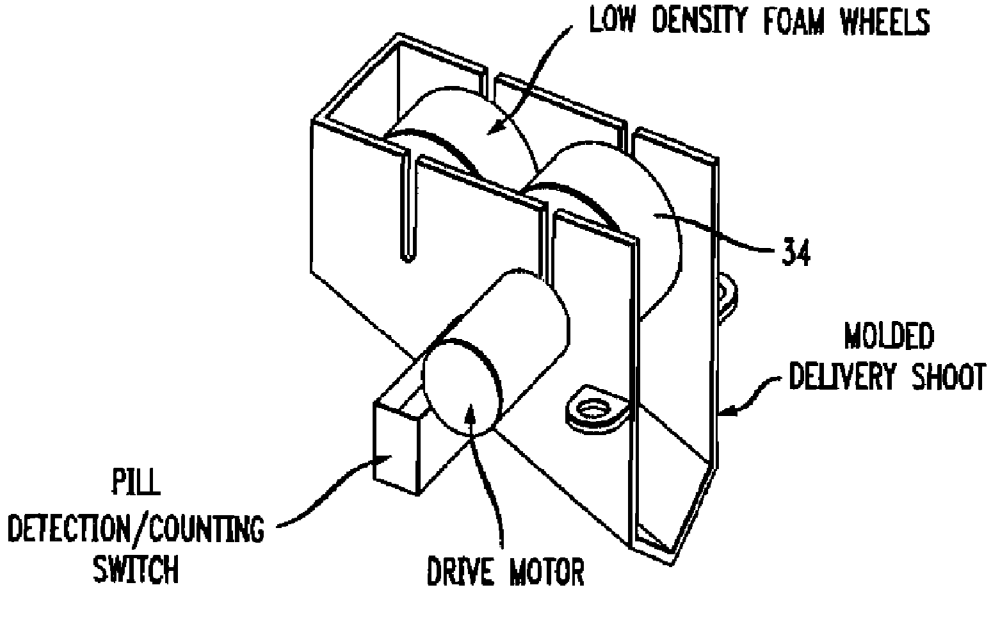
FIG. 9 is an elevation showing portions of an exemplary pill or capsule feeding roller arrangement for use to meter out individual pills.

FIG. 9 is a detailed view showing a pill feed device, one being located under each of the pill chambers i.e. supply bins 32. Like other elements of the dispenser of the invention, the pill feed device is modular. As a result, the dispenser can be embodied with different numbers of chambers and pill feeds in an expandable manner.

The pill feed device is operated by the controller 22 as described above and has two rollers 34 that form a nip. The rollers are low density foam so as to admit a range of pill sizes without crushing. At least one of the rollers is drivable by a motor from a signal generated by controller 22 or by a driver associated with the I/O interface 48. It is possible to drive both rollers using one motor and a gear arrangement coupled to the second roller.

The roller arrangement does not have a positive point of engagement with a pill, so the rollers 34 are driven until a pill is detected, for example by a photodetector. Each modular pill feed can have a photo detector, or a detector can be provided in chute fed commonly by several pill feeds. In either case, the feeder advances until a pill is fed and then is stopped, and optionally reversed.

Figure 10:
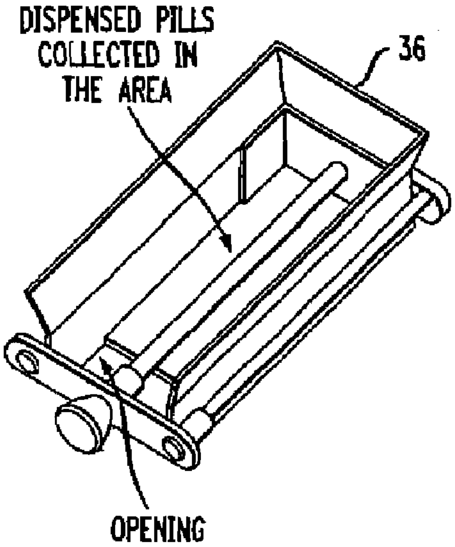
FIG. 10 shows a drawer arrangement wherein a user-operated sweep to be used to move metered pills to a discharge area, is shown in a retracted position.
Figure 11:
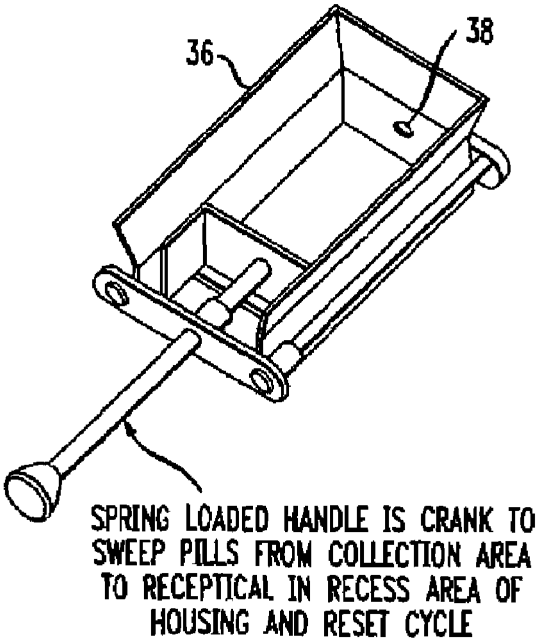
FIG. 11 is a view corresponding to FIG. 10, in which the sweep is advanced, this movement being electromechanically detectable.

Each fed pill drops into a receptacle that requires a mechanical movement to empty, an example being shown in FIGS. 10 and 11. In this arrangement, a fed pill drops into a receptacle area 36. A spring loaded handle is pulled forward by the user to sweep the pills toward a front edge at which the pills drop through the front structure into the user's hand or into a catch cup. As mentioned above, the drawer structure has a sensor 38 to detect access by the user. When the drawer structure is opened as detected by sensor 38, the controller concludes that the user has imbibed the pills fed.

Figure 12:
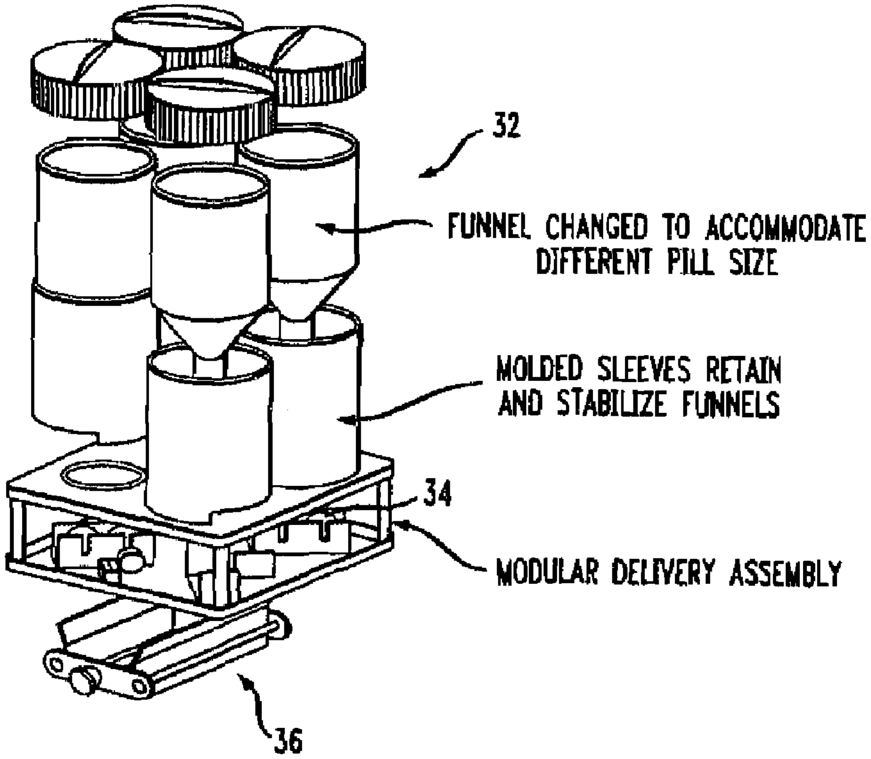
FIG. 12 is an exploded perspective view showing the relationship of certain elements associated with the metered feeding of medication from several supplies.

FIG. 12 illustrates a modular set of four pill chambers, in exploded view. In this embodiment, the different pill chambers or supply bins 32 have inserts with funnel shaped bottom openings arranged to entrain pills in single file leading into the feed rollers 34. The funnel shaped inserts, which can be the same containers in which quantities of pills are received from the pharmacy, are received in sleeves and have a outside diameter complementing the inside diameter of the sleeves. The necks of the funnels are of different inside diameter to complement the diameter of the pills. This diameter is slightly larger than the span of one pill and at least smaller than the span of two pills, to prevent jamming.

The program for each medication requires entry of certain information, including the identification of the chamber involved, and identification of the medication at least by number of pills. A chart can be provided to identify the correspondence between chamber positions and their identities, or the device can include a sensor such as a limit switch and require that the particular chamber be removed briefly when programmed, to ensure that the data entered for a chamber and the position at which the pills are loaded are in fact the same.

In the embodiment shown, four distinct chambers are provided. The chambers as shown are the same outer size but can admit pills of different sizes using inserts. It is possible to have chambers of different sizes to accommodate different sizes and counts of pills.

Preferably, the name of the medicine in each chamber is labeled directly on one or both of the chamber and its cap. Labels can be provided from the pharmacy together with the medication. The caps are preferably child-proof.

The user empties a supply of medicine into the respective chamber, and closes the childproof cap, placing the chamber into the unit in position to feed pills, if the chamber is of the removable type preferred. The user follows the instructions provided on the display 42, for example choosing from menu options as to how many pills per dose, and how many doses per unit of time. The time unit can be a day, an hour, a month, etc. The dosage can be regular or irregular.

The program can prompt to start timing immediately or at some later time (e.g., the user's expected bed time). The program can prompt for a maximum term to continue, such as two weeks, or a minimum term, such as continue until supply is exhausted. Any special instructions can be chosen, preferably from a menu, or otherwise entered, such as:

| | |
|---|---|
| a. | Take with water |
| b. | Take with meals |
| c. | Take before meals |
| d. | Take after meals |
| e. | Take on an empty stomach |
| f. | Avoid alcohol |
| g. | Avoid driving |
| h. | Take for pain |
| i. | Take for nausea |

-continued

| | |
|---|---|
| j. | Take for blood pressure |
| k. | Others (user entered) |

Other options are also possible, such as choice of type of alarm between a buzzer or chime. Preferably the device "rewards" responding to an alert and extracting a pill, e.g., by playing a tune or playing back a congratulatory phrase.

When the programmed device generates an alert warning the user it is time to take a pill, the user simply pulls the dispenser drawer open and catches the pill. Pushing the drawer closed again silences the alarm and commences timing for the next dose.

The "override" function is used to select override for any of the chambers and to trigger feeding of the pill. As above, the feeding of a pill in override mode is noted and can affect the program with respect to determining maximum dosages, the time to the next dose, etc. Dispensing on demand involves triggering feeding of a pill followed by opening the drawer, extracting the contents and closing the drawer again as described.

Figure 13:
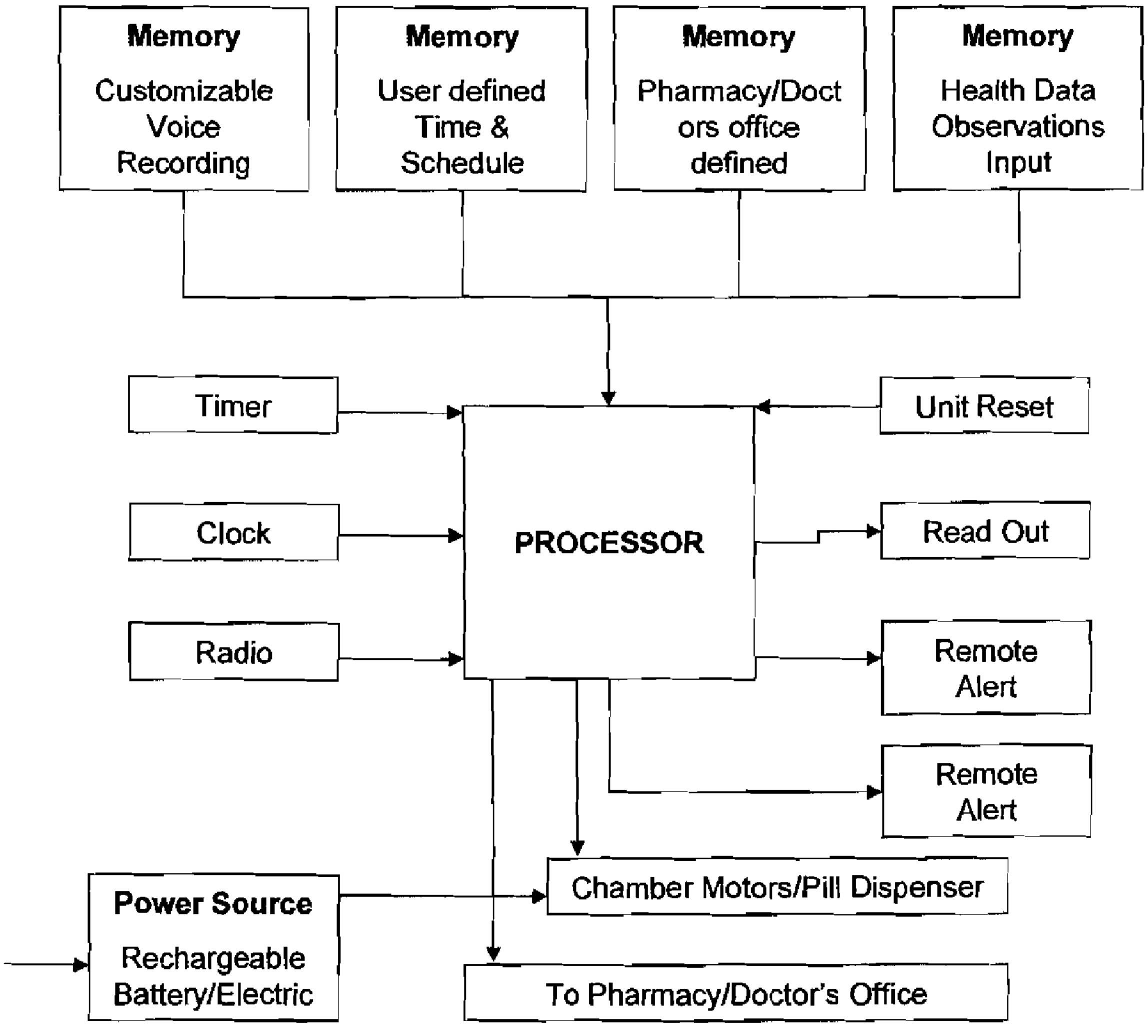
FIG. 13 is a block diagram showing the functional elements of a preferred embodiment of the inventive dispenser.
Figure 14A:
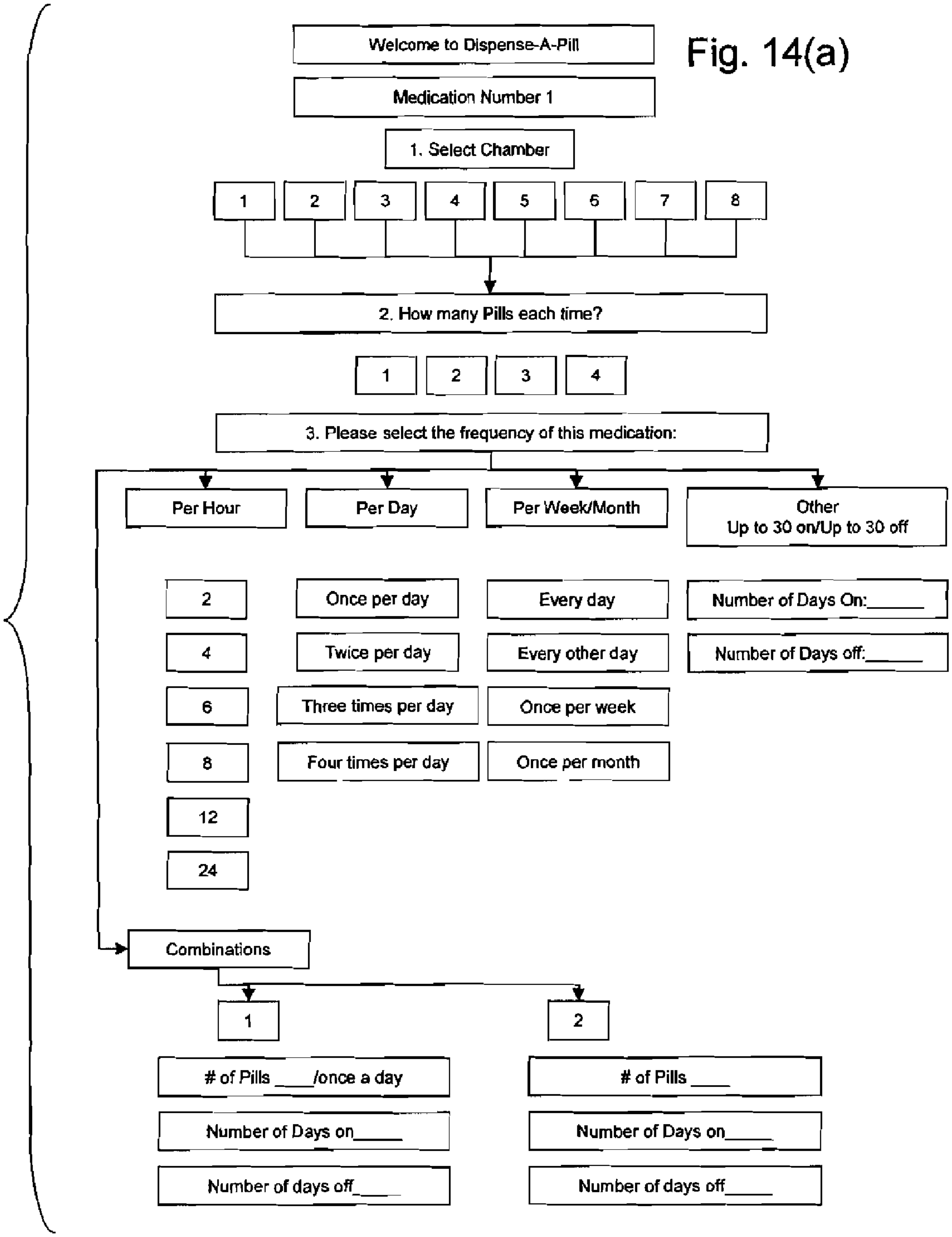
FIG. 14 is a block display of exemplary progressive prompt display screens.
Figure 14B:
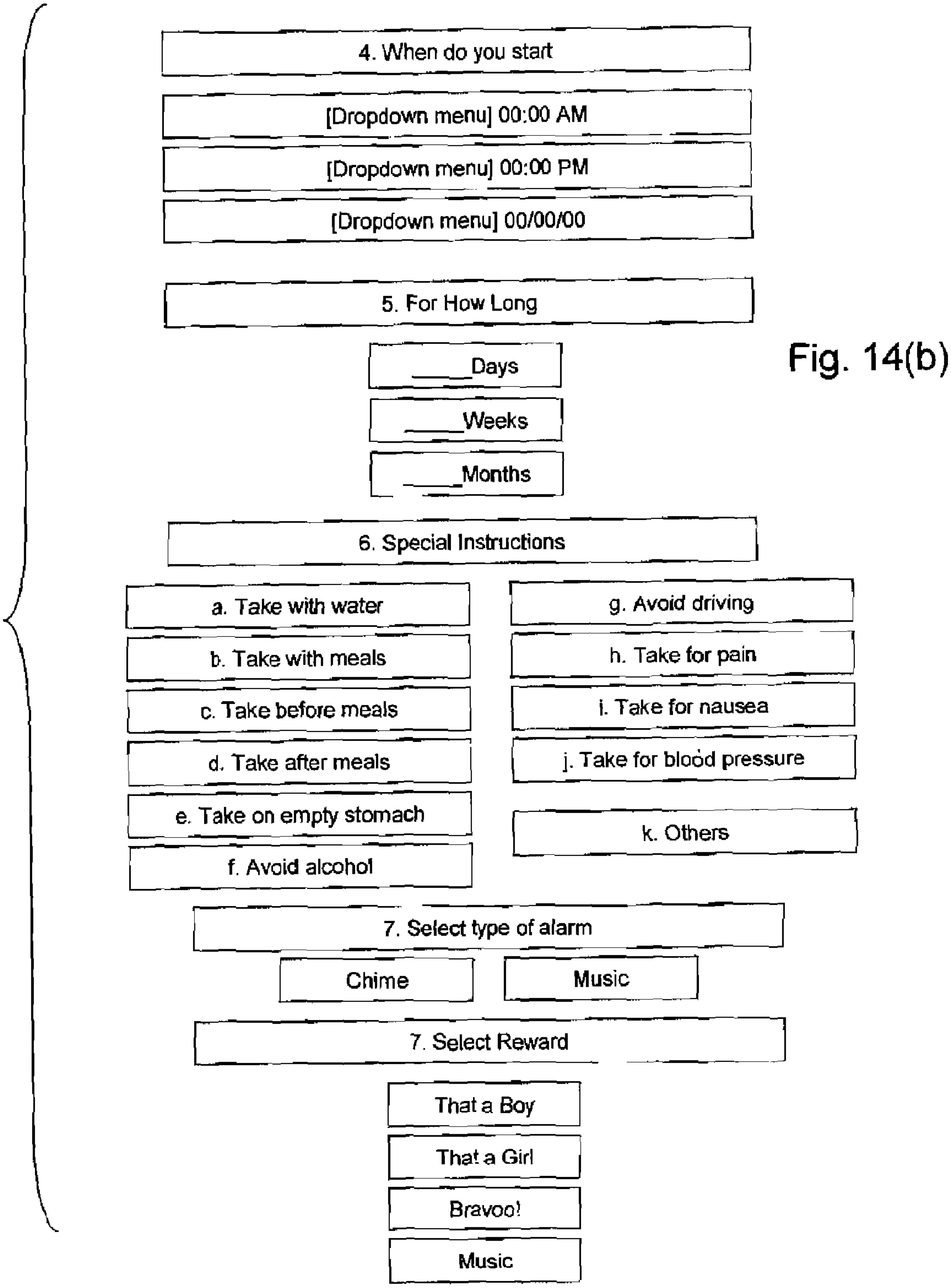
Figure 14C:
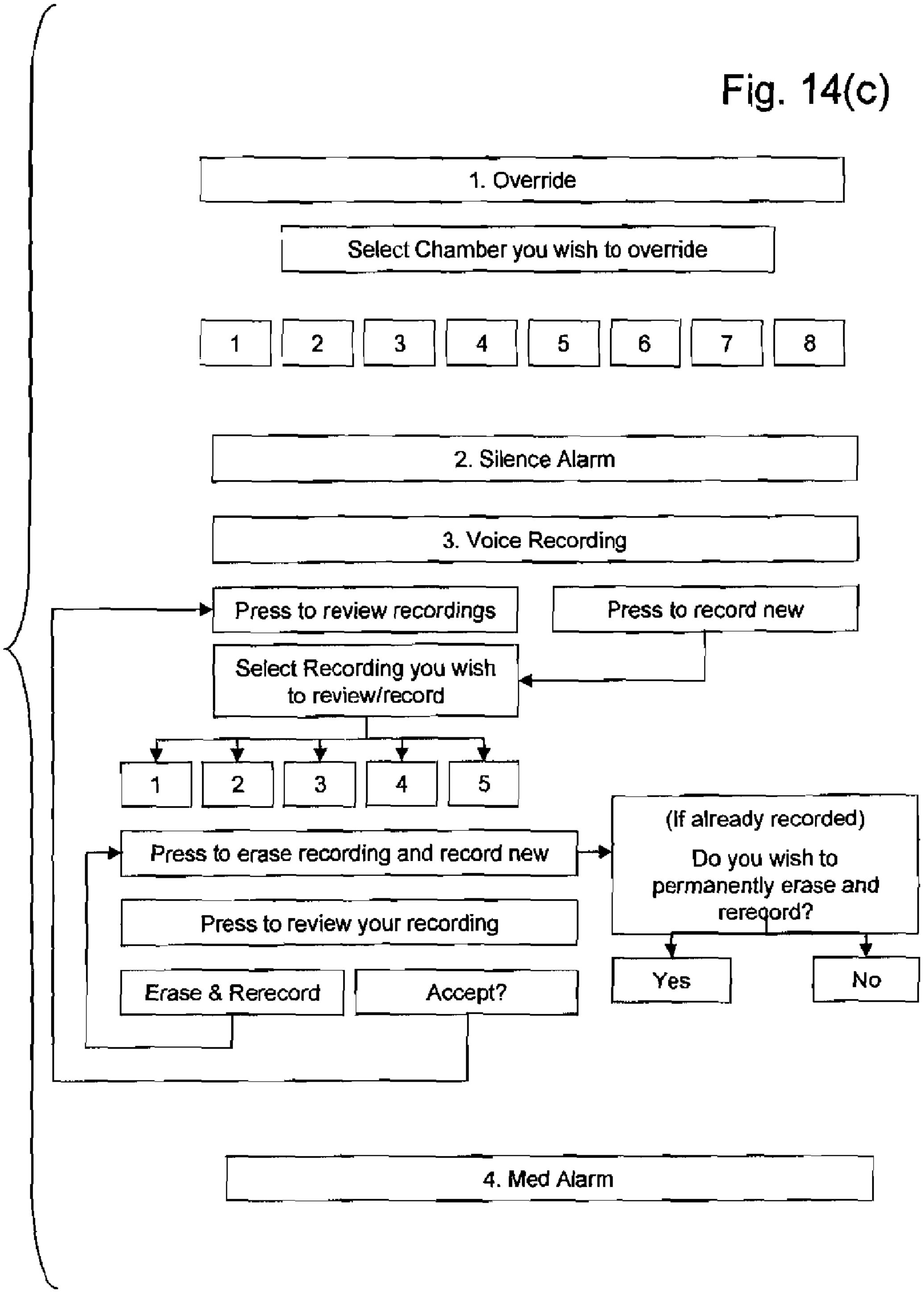

FIG. 13 is a block diagram showing the functional elements of a preferred embodiment of the unit. FIGS. 14(*a*) through 14(*c*) are illustrate progressive prompt display screens.

The invention having been described with respect to examples including the preferred embodiments show and discussed, it will be apparent the additional variations and combinations of features can be used as well. The invention is intended to encompass not only the foregoing examples, but also the range of variations that is met by the following claims.

The invention claimed is:

1. A dispenser for dispensing a dose of medication, comprising:

at least one chamber for holding a supply of loose and randomly oriented pills;

a device adapted to dispense one pill at a time from said supply of loose and randomly oriented pills;

a controller adapted to operate said device to dispense a preset number of pills from said at least one chamber at a preset time;

the controller being programmable by access to data from at least one of a pharmacy, a smartcard reader, a programmable digital assistant (PDA), a cell phone, and a network link;

wherein the device dispenses said one pill to a receptacle area including a drawer having a spring loaded handle and a sweep attached to the handle, and the dispenser further comprises a sensor that detects when the receptacle area is open or has been accessed by a user; and a system for improving compliance by a user with a preset pill dispensing schedule, in which selectable, personalized alerts or messages are providable to at least one of reminding the user that said one pill has been dispensed or rewarding the user for being in compliance with the dispensing schedule.

2. The dispenser of claim 1 wherein said at least one chamber comprises a plurality of chambers.

3. The dispenser of claim 2, wherein said plurality of chambers comprises a plurality of sleeves and a plurality of inserts being adapted to slide into any of said plurality of sleeves, said plurality of inserts comprising a first insert and a second insert, said first and second inserts each having a funnel-shaped lower portion and a neck, said neck of the first insert being a different size than said neck of the second inset with the diameter of the bottom openings of the funnel shaped lower portions being slightly larger than the span of a pill to be dispensed through said bottom openings.

4. The dispenser of claim 1, further comprising an alarm coupled to said controller, operable to alert the user when said one pill has been dispensed to said receptacle area and said receptacle area has not been accessed by said user since said one pill has been dispensed to said receptacle area.

5. The pill dispenser of claim 1, wherein said controller is operable to maintain a pill dispensing schedule for each of said at least one chamber, said dispensing schedule comprising a number of pills and at least one of a time of day and hours of delay between doses, wherein the pill dispensing schedule for one of said at least one chamber can be different from the pill dispensing schedule for one another of said at least one chamber.

6. The pill dispenser of claim 5 wherein said dispenser may be used to manage pill dispensing schedules for at least two users.

7. The pill dispenser of claim 1, further comprising an input device, wherein said controller is adapted to dispense a pill from at least one chamber in response to a dispense request from the user via the input device.

8. The pill dispenser of claim 7, wherein the controller is programmed not to dispense a pill from the at least one chamber in response to a dispense request from the user if the number of pills dispensed from that one of the at least one chamber exceeds a pre-determined maximum number of pills within a predetermined time period.

9. The pill dispenser of claim 8, wherein said controller is operable to monitor at least one of a count of pills remaining in said at least one chamber and a count of pills dispensed to said user.

10. The dispenser of claim 1 in which the device for dispensing one pill at a time from said supply of loose and randomly oriented pills is comprised of a first roller and a second roller, at least a portion of each of the first and second rollers being made of a compressible material.

11. The dispenser of claim 10, wherein the compressible material comprises foam.

12. The dispenser of claim 10, wherein said first roller rotates about a first axis, said second roller rotates about a second axis, said first and second axes remaining stationary when said one pill passes between said first rollers and said second roller.

13. The dispenser of claim 1 wherein after the receptacle area has been accessed by a user, a custom, personalized message is played to improve user compliance with a preset pill dispensing schedule.

14. The pill dispenser of claim 1 in which said controller is programmable to maintain time and schedule information for medications not dispensed by said dispenser.

* * * * *